May 4, 1937. E. J. RABENDA 2,079,422
RECORD CONTROLLED MACHINE
Filed Oct. 10, 1933 3 Sheets-Sheet 1

May 4, 1937.  E. J. RABENDA  2,079,422
RECORD CONTROLLED MACHINE
Filed Oct. 10, 1933   3 Sheets-Sheet 3

INVENTOR
Edward J. Rabenda
BY
ATTORNEY

Patented May 4, 1937

2,079,422

UNITED STATES PATENT OFFICE 2,079,422

RECORD CONTROLLED MACHINE

Edward J. Rabenda, Binghamton, N. Y., assignor to International Business Machines Corporation, New York, N. Y., a corporation of New York Application October 10, 1933, Serial No. 692,946

13 Claims. (Cl. 209—110)

This invention relates to record controlled machines in general, particularly those controlled by perforated record cards like the ones used in the well-known Hollerith system of compiling accounting and statistical data.

The broad object of the invention is to provide a machine adapted to materially shorten the time required to sort records according to data designations in such records.

Another broad object of the invention is to provide a sorting machine capable of sorting records in accordance with both the vertical and horizontal disposition of designations in such records.

Still another broad object is to provide a sorting machine which is more flexible and adapted to perform a greater variety of operations.

Another object is to provide a machine adapted to sort records bearing alphabetical data designations, representing words, names and addresses, and the like, more economically.

A further object is to provide a machine capable of sorting records according to the length of names or like data represented by data designations in such records.

Still another object is to provide a machine adapted to sort records according to the extent to which a given field comprising several columns of the record may be provided with data designations.

A further object is to provide a machine capable of performing the usual functions of sorting machines in addition to attaining all the objects mentioned in the preceding paragraphs.

Various other objects, advantages, or features of the invention will be particularly pointed out in the following description and claims or will be apparent from a study of the description, claims, and/or the accompanying drawings.

The various objects of the present invention, the mechanism for attaining these objects, and the principles of operation of such mechanism will be most readily understood by first giving an illustration of a common problem which the invention solves, namely, the elimination of waste time in sorting records bearing alphabetical data such as names of individuals or firms.

Machines have been devised for perforating, sorting, and tabulating the data on records on which some of the data are alphabetical. There have been numerous machines designed to be controlled by alphabetical data designations and quite a number have been marketed and are now well-known in the art. In practically all of the machines so far built, the alphabetical data (names, addresses, and the like) are designated in accordance with some system of code perforations.

Figure 3:
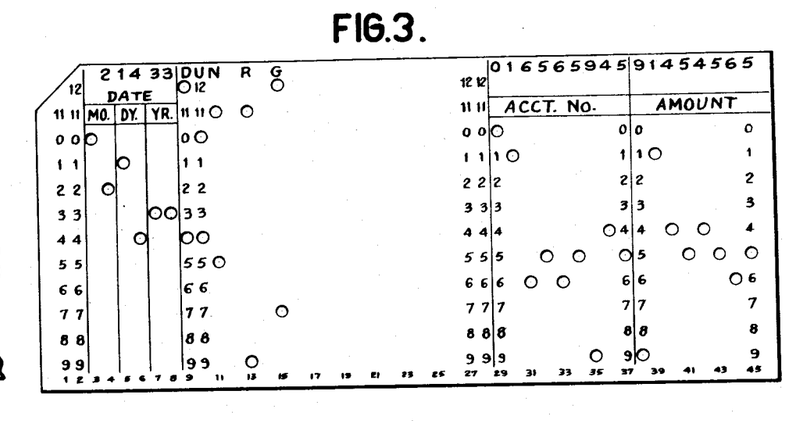
Fig. 3 is a view of a form of record which the machine is adapted to sort.

The most common problem in sorting records having such alphabetical designations is to place the records in alphabetical order. Fig. 3 shows a style of record card which may be used in the machine described herein. It consists of a standard 45 column Hollerith record card arbitrarily perforated in columns 3 to 8 to represent a date (February 14, 1933), in columns 29 to 37 to represent an account or serial number (No. 016565945), and an amount ($914,545.65), according to the usual Hollerith system. Columns 9 to 28 have been perforated to represent the name "R. G. Dun" in accordance with a code adapted for use in perforating Hollerith record cards.

In the particular code used in perforating the card of Fig. 3, the letters of the alphabet are represented by two holes, one of which is in the "0", "11", or "12" index-point positions and the other in one of the lower nine index-point positions. The form of code used is purely arbitrary and of no importance in sorting the record cards according to length of name, as will be obvious later herein.

For sake of completeness the code is given below, the first vertical row of each column containing the letter of the alphabet and the second vertical row in the index-point positions in which the holes appear.

| | | | |
|---|---|---|---|
| A—1, 12 | N—5, 11 | | |
| B—2, 12 | O—6, 11 | | |
| C—3, 12 | P—7, 11 | | |
| D—4, 12 | Q—8, 11 | | |
| E—5, 12 | R—9, 11 | | |
| F—6, 12 | S—2, 0 | | |
| G—7, 12 | T—3, 0 | | |
| H—8, 12 | U—4, 0 | | |
| I—9, 12 | V—5, 0 | | |
| J—1, 11 | W—6, 0 | | |
| K—2, 11 | X—7, 0 | | |
| L—3, 11 | Y—8, 0 | | |
| M—4, 11 | Z—9, 0 | | |

In perforating record cards like that of Fig. 3, it is necessary to leave certain columns blank in order to separate by a space the different parts of a name, such as the initials and prefixes or suffixes like "Von", "de", "la", "Jr." and "Sr." This is necessary so that the tabulating machine printing mechanism will print the names with the various parts properly spaced and easily readable.

Figure 4:
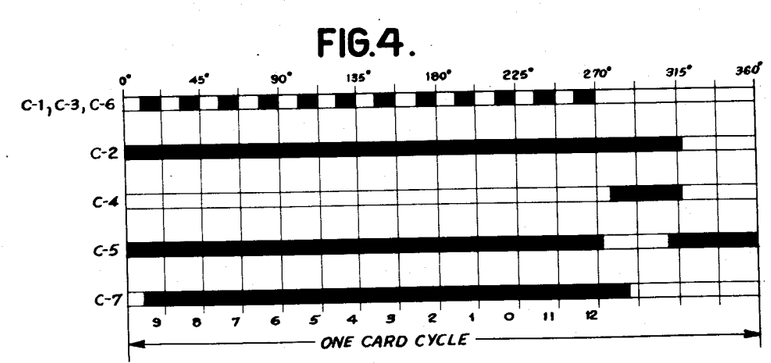
Fig. 4 is a chart showing the timing of the various commutators, emitters and contacts shown in the wiring diagram.

It is obvious that names vary in length from a few letters like in the case of "J. W. Roe" up to a number of words like "Juan de la Montana", as examples. In order to explain why it is desirable to sort the cards according to the length of the name, it will be assumed that a given batch of say 10,000 cards contains cards perforated to represent the following names, which cards are to be sorted to bring them into alphabetical order:

Dun R G
    Bradstreet
    American Cyanamid
    Spicer Mfg Co
    Jenkins Mfg Co
    Wright Aero Corp
    Botany Worsted Mills
    Phillip Morris Co
    Simmons Co
    Imperial Oil Limited
    Socony Vacuum Corp It will be noted that the number of columns necessary to properly designate the above names in the cards varies from seven columns (including the blank spacing columns) for the first name above to twenty for the seventh name. Thus, at least twenty columns of the cards must be assigned to receive the holes designating the above names. In the illustrative card of Fig. 3, columns 9 to 28 comprise a field devoted to reception of the holes designating the names and for convenience may be termed the name field. In order to simplify the perforating of the holes designating the names and also to insure proper sorting of the cards in alphabetical order, the holes designating the most significant part of a name are placed in the first or left-hand columns of the name field (Fig. 4) and the other parts of the name appear in their proper order on the right of the most significant part of the name.

The "International" electric sorting machine has thirteen sorting pockets for receiving the cards. Since there are twenty-six letters of the alphabet it is plain that it is impossible to sort the cards alphabetically in less than two complete passages of the cards through the machine for each column. When there are a large number of names, all differing but having common features of likeness, as in the case of the names "Smith," "Thomas," "Jones," and other very common names, it is necessary to sort the cards alphabetically in quite a number of columns or even for all columns of the name field. As at least two passages of each card are required per column, it is quite clear that sorting cards alphabetically, even with the very simple code given above, is a very lengthy process.

For example, assume that there are 10,000 cards similar to the one shown in Fig. 3 and that there are as many as 1,000 different names, so many that it is necessary to sort alphabetically on every column of the twenty devoted to the name field. This requires that each card be passed through the machine at least forty times, or twice for each column, before the cards are likely to be in proper alphabetical order. The machine will in effect have to sort 400,000 cards and, at a speed of 400 cards per minute, it would require at least sixteen hours of continuous operation of the sorting machine to place the 10,000 cards in alphabetical order.

It will be noted that a short name occupying less than half the name field would be handled a large number of times unnecessarily. The name R. G. Dun, for example, occupies only seven columns of the name field. This means that each R. G. Dun card would be sent to the reject pocket 26 times when sorting in accordance with the last 13 columns of the name field due to the fact that the latter columns of the R. G. Dun cards are unperforated. If there were, let us say, 100 R. G. Dun cards alone, they would be rejected 2,600 times by the machine which would mean at least six and one half minutes of wasted time. Since few of the cards would have perforations in all the columns of the name field, it is quite apparent that a very large part of the operating time of the machine is wasted in rejecting the cards having names which only partly fill the name field. When a large number of cards have to be sorted it is plain that the wasteful rejecting of cards is quite an item of expense besides making the operation of sorting the cards alphabetically very lengthy unless a large number of sorting machines are available to divide the work. This is not often the case and is not economical whatever may be the circumstances.

It will be appreciated that a considerable amount of time would be saved if the cards could first be sorted into groups according to the lengths of the names, and thereafter the cards having the longest name are sorted separately according to the holes in the highest column having a perforation, combined with the cards having the second longest name and sorted in accordance with the holes in the last perforated column of the group having the second longest name and so on until, as the final operation, all the cards are sorted in accordance with the holes in the first column of the name field. According to this procedure, a batch of cards in which twenty columns are assigned to receiving the holes representing the names might, as a first step, be sorted into, let us say, thirteen groups. In one group would be placed all cards having names twenty columns long, in another the cards having names nineteen columns long, and so on. The first group would then be sorted alphabetically in accordance with the last or twentieth column in the name field and combined with the second group having names nineteen columns long. This combined group of cards would then be sorted alphabetically in accordance with the next to the last, or nineteenth column of the name field. The combined first and second groups of cards would now be combined with a third group of cards in which the names occupy only eighteen columns and sorted in accordance with the holes in the eighteenth column of the name field, and so on. As names of individuals seldom have less than six or seven letters and the names of most firms seldom have more than twenty letters when abbreviated in the approved way, all the cards will probably be sorted in each of the first seven columns of the name field.

The arranging of the cards in groups according to the lengths of the names can not be done economically by prior types of sorting machines, that is, there is no advantage gained as the major share of the cards would have to be passed through the machine as many times as the number of groups of different lengths of names before alphabetical sorting operations could be commenced and the net gain would be slight owing to the necessary extra handling of the cards, wear on the machine, and delaying other sorting operations.

The present invention provides a machine which is capable of sorting the cards in accordance with the lengths of the names as well as being capable of performing ordinary sorting operations, both alphabetical and numerical.

Purely as a matter of convenience, the present invention will be described by showing how it may be embodied in a type of sorting machine well-known to those skilled in the art as the "International" electric sorting machine. It is desired to point out, however, that the form of embodiment and type of machine selected for the purpose of describing the invention have been arbitrarily selected and there is no intention to limit the scope of the claims of this application to such form of embodiment or type of machine.

The "International" electric sorting machine has been frequently described in prior patents of which No. 1,741,985 and No. 1,741,992 taken together show most of the details of construction of the machine known commercially. Since the aforesaid patents are very detailed, it will be unnecessary to include in the present description more than a very brief description of the general features of construction and operation. The above patents should be consulted for a fuller description.

Figure 1:
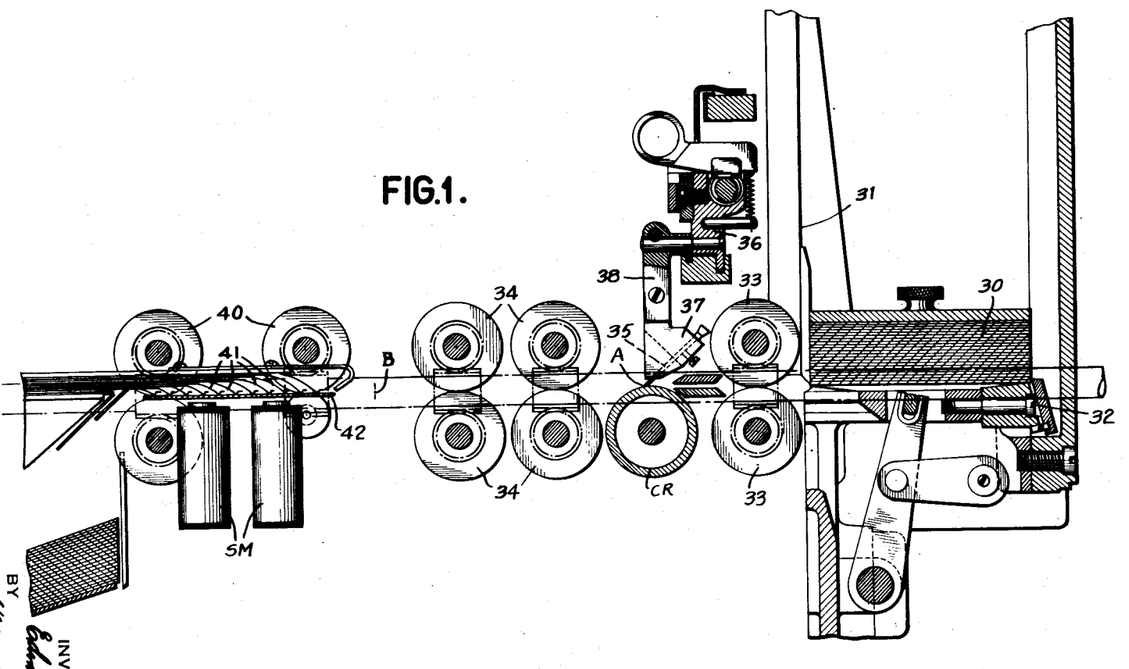
Fig. 1 is a vertical longitudinal section of the right hand end of the machine.

The machine illustrated in Fig. 1 is substantially identical in mechanical details with the "International" electric sorting machine now on the market with the exception that the main frame of the machine has been lengthened approximately four inches to permit the analyzing mechanism to sense each record one record cycle before the cycle in which final disposition of such record is made in response to the analysis of such record. Additional feed rollers have also been provided to carry each record from the analyzing position or station to the point where the ultimate disposition of the record is made. The reasons for making the above changes will be made clear at the proper time hereinafter.

The perforated records 30, which take the form of standard Hollerith cards, are placed in the magazine 31 face down with the "9" index point positions at the left and are removed from the magazine one at a time by means of the usual card picker 32. The latter is given one reciprocation per card cycle by a well-known means driven from the main shaft (not shown) and projects each card removed from the magazine between feed rollers 33 also driven by the main shaft. The rollers 33 carry the records past the analyzing position A into a position to be gripped by the right hand set of a group of feed rollers 34.

At the analyzing position A may be located record sensing means which may take the form of a single electrical sensing brush when ordinary sorting operations are to be performed and of a group of twelve sensing brushes 35 when records are to be sorted according to the length of a name or other perforated data. As is usually the case, the record sensing device may be removably mounted in a carrier 36 which may be moved by hand to bring the sensing brush or brushes in the carrier into position to sense perforations in preselected columns of the record cards. Patent No. 1,741,992 shows suitable mean for shifting the carrier 36 to bring the sensing brushes 35 into cooperation with any desired field or column on the record cards.

Figure 5:
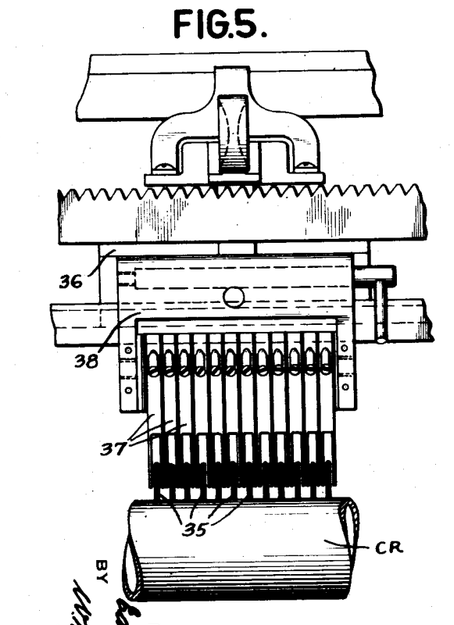
Fig. 5 is a vertical elevation of the brush holder and its carrier.

The record sensing device and its carrier are shown in section in Fig. 1 and in elevations in Fig. 5. Conveniently, they may be identical in construction with similar parts described in application Serial Number 499,464 filed December 2, 1930 by Ulrich Kolm. Only a few details will be given herein as the construction is fully described in the above application. Each of the twelve brushes 35 is carried by an element 37 (Figs. 1 and 5), which is insulated from the other elements 37 and is rigidly mounted in and insulated from a bifurcated member 38 which may be termed the brush holder. The elements 37 are connected individually to the twelve wires of a suitable flexible cable 39 (Fig. 2) by means of which the brushes 35 are connected to the brush relays later to be described.

When ordinary single column alphabetical or numerical sorting operations are to be performed, a single brush holder like the member 38, and supporting a single brush 35b (Fig. 2) insulated from its supporting member 38, may replace the multiple brush holder 38. The brush 35b will be connected through a flexible wire 39b (Fig. 2) to an impulse emitter C—3 to be described later herein.

The brushes 35, 35b, when the holders 38 are in proper position in the carrier 36, bear on the surface of a contact roller CR located at the analyzing position A and journaled in the frame work between the lower feed rollers 33, 34. The contact roller CR may consist of a metallic tube insulated from its supporting shaft, and as usual, may co-act with a common brush 35a (Fig. 2) mounted at a suitable place in the frame work.

The feed rollers 34 carry each record analyzed by the brushes 35 or 35b to the left to the position B which corresponds to the analyzing position of the machine described in Patent No. 1,741,985. In the present case the position B will be reached by the leading edge of any record at the time when the leading edge of a succeeding record reaches the position A and is about to be traversed by brushes 35 or 35b. In the case of a machine operating according to a 16 point cycle and using standard Hollerith cards the distance from position A to position B will be exactly four inches since the vertical distance between indexpoint positions of Hollerith cards is exactly one fourth of an inch. When any record reaches position B it is about to begin the cycle in which disposition of such record is to be made in accordance with an analysis made by brushes 35, 35b while such record is moving from position A to position B.

After a record has passed position B a sufficient distance, other feeding rollers 40 grip the record and carry it still further to the left. Other feed rollers, like the rollers 40, carry the record to the receiving pocket determined by the analysis of the record.

After the leading edge of a record has reached position B such edge passes successively underneath the upturned ends of the usual sorting blades 41 which rest on a plate 42 which may be part of the armature of the sorting magnet SM, the record passing over the plate 42. This mechanism operates substantially the same as in Patent No. 1,741,985 hence no extended description of its operation will be necessary. It will be sufficient to state that in ordinary sorting operations, if a hole occurs, in say the "3" position, of a column in any record, the magnet SM will be energized at the "3" position of the cycle in which such record is passing underneath the blades 42 and a gap will be created between the "3" and "4" blades into which will pass the record having the "3" hole and such record will be guided to the "3" receiving pocket. As usual the machine may have thirteen receiving pockets of which twelve correspond to the twelve index-point positions of the record columns (and also of the cycle), while the thirteenth is the "reject" pocket for receiving those cards having no perforations in columns sensed by brushes 35, 35b. Only the "reject" pocket has been shown in Fig. 1.

In the machine of Patent No. 1,741,985 the impulse of current which operated magnet SM was caused directly by a single sensing brush located at position B. In other words, disposition of a record was effected immediately after the sensing of a hole. The embodiment of the present invention in the "International" electric sorting machine requires that each record be analyzed completely before a disposition can be made of such record and for that reason provisions have been made for delivering the operating impulse to magnet SM one cycle after the analysis of such record. The manner in which the normal sorting operations are carried out will be more fully explained hereinafter.

The twelve brushes 35 sense a field comprising twelve columns of the record cards. Obviously, in order to determine the length of a name in any card like that of Fig. 3, it is necessary to determine the number of columns in the right hand portion of the field which lack perforations. Accordingly the carrier 36 (Fig. 1) is set by hand so that the extreme left-hand brush 35, in Fig. 5 (or the uppermost brush, Fig. 2) senses the last or highest numbered column of the main field (that is, column 28 in Fig. 4). The extreme right-hand brush 35 in Fig. 5 (the lowest, Fig. 2) will then sense the 17th column of each card. Each brush 35 corresponds to one of the index-point positions of a column and also to one of the receiving pockets of the sorting machine. The small numerals above and to the right of each brush indicate the pocket corresponding to such brush, the brushes being designated in the same order as the index-point positions in Fig. 3 which is also the order in which the row of pockets are designated in the machine.

Figure 2:
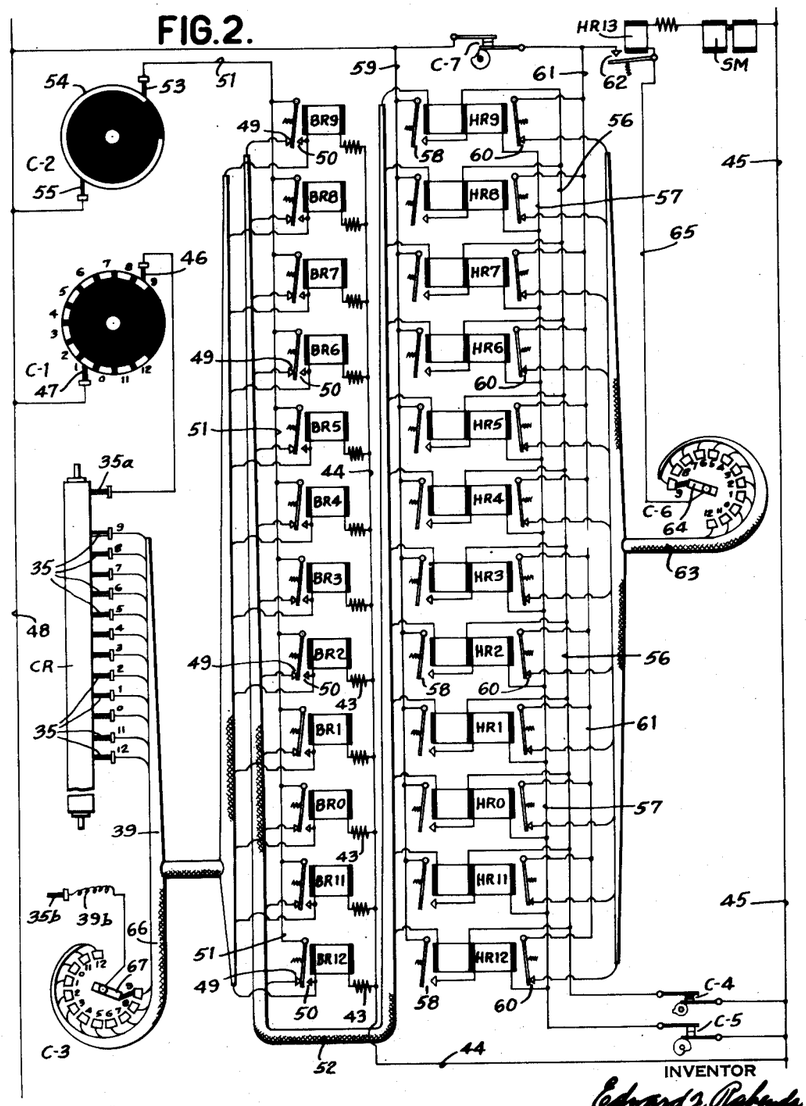
Fig. 2 is a diagram of the electrical connections.

Each sensing brush 35 has associated therewith, a brush relay and a holding relay and these respective relays are shown in two parallel vertical rows in Fig. 2, the brush relays being designated BR0 to BR12 inclusive, while the holding relays are designated HR0 to HR12, inclusive. The numerals after the letters BR and HR designate the value of the index-point position and the pocket corresponding to each relay and for convenience the order of such numerals from top to bottom corresponds with the order of the sensing of the index-point positions by brushes 35 and the order of the numerals adjacent such brushes.

One end of the winding of each brush relay is connected to the corresponding brush 35 through the medium of a wire in cable 39. Thus, the relay BR9 is connected to the extreme upper brush 35 in Fig. 2. The other end of the winding of each brush relay is connected, through a suitable resistance 43, to a common wire 44 leading to the right hand line wire 45. The common brush 35a of contact roll CR is connected to a brush 46 which wipes over the segments of the selecting commutator C—1. The latter may be substantially identical with the commutator described in Patent No. 1,741,985 and need not be described in detail herein as it is well known and described fully in said patent.

It will suffice to state that each segment of commutator C—1, corresponds to a given index-point position of the record card columns and may be made current conducting with respect to a common contact ring (not shown) on which a brush 47 bears, the latter being connected to the left line wire 48. The index-point value of each segment of commutator C—1 is indicated in Fig. 2 by small numerals adjacent each segment. Needless to say, the brush 46 contacts with each segment of commutator C—1 at the instant when brushes 35 are sensing corresponding index-point positions in a record card.

Each brush relay is provided with normally closed contacts 49 and normally open contacts 50 having a common number which is connected to a wire 51. The contacts 50 of each brush relay are connected to the left end of the winding of such relay while the contacts 49 are connected to individual wires of a cable 52. The wire 51 is connected to a brush 53 which coacts with a long segment 54 of a commutator C—2. The latter has a continuous contact ring (not shown), connected to segment 54, and also has a brush 55, connected to the left hand line wire 48, and bearing in the contact ring. It should be stated here that in the well known "International" electric sorting machine the commutators C—1, C—2 are constructed as a unit wherein the function of the brushes 47, 55 is performed by a single brush and a single common contact ring coacts with said brush. The single commutator unit used in practice, in the present case has been shown as two separate commutators in order to make the operation of the commutator easier to understand. The segment 54 is slightly longer than usual to better adapt the commutator unit to the needs of the present invention.

Each of the holding relays HR0 to HR12, inclusive, has a double winding and two sets of contacts both actuated by either winding. The left hand winding of each relay is connected to a corresponding wire of cable 52 and also to a common wire 56 which is connected to the right hand line wire 45 through cam actuated contacts C—4. Thus, the uppermost relay HR9 is connected to contacts 49 of brush relay BR9 through a wire in cable 52.

The right hand ends of the right hand windings of the holding relays HR0 to HR12 are connected, through a common wire 57 and cam actuated contacts C—5, to the right hand line wire 45, while the left hand ends of such windings are individually connected to the normally open contacts 58 of each holding relay. The latter contacts are connected to the left hand line wire 48 through a common wire 59.

The normally closed contacts 60 of the holding relays HR0 to HR12 are connected to left hand line wire 48 through a common wire 61 and cam actuated contacts C—7. The wire 61 also is connected to one of normally open contacts 62 of a holding relay HR13. The contacts C—7 and 62, and the windings of relay HR13 and sorting magnet SM are all in a series circuit extending between line wires 45, 48. The contacts 60 are also individually connected to the wires of a cable 63 leading to an impulse emitter or commutator device C—6. The impulse emitter is simple in construction and may comprise a series of circularly disposed segments with which coacts a rotary brush 64 adapted to wipe over all the segments once per card cycle. Each segment corresponds to one of the holding relays HR0 to HR12 and is connected to the proper wire in the cable 63. The brush 64 is connected by a wire 65 to a point between the winding of relay HR13 and its contacts 62.

The cable 39 is tapped and each wire therein connected through a cable 66 to an impulse emitter C—3 which may be identical with the impulse emitter C—6. Each segment of the impulse emitter C—3 corresponds to one of the brushes 35 with which it is connected through wires in cables 39, 66. The wiping brush 67 of impulse emitter C—3 is connected to the brush 35b through the flexible wire 39b mentioned before herein.

The commutators C—1, C—2, C—3, and C—6 all rotate in synchronism with each other. Adjacent the segments of the impulse emitters C—3, C—6 small numerals indicate the index-point value of such segments and the card receiving pockets corresponding to such segments. The contacts C—4, C—5, C—7 may be actuated by suitably shaped cams which make one revolution per card cycle. The timing of the commutators C—1, C—2, impulse emitters C—3, C—6, and contacts C—4, C—5, C—7 is shown diagrammatically in Fig. 4 wherein the heavy black lines indicate the duration of contact.

The control circuits for the driving motor may be of any suitable form and need not be described herein. Patent No. 1,741,985 describes a suitable arrangement for controlling the driving motor.

The operation of the machine in sorting the cards into groups according to the lengths of the names will now be explained in detail. It will be assumed that cards like the one illustrated in Fig. 3 are to be used and that the names may be of various lengths like the illustrative group listed on a preceding page. The segments of commutator C—1 will all be made current conducting, the brush holder 38 for brushes 35 will be set in the carrier 36, and the cards will be placed face down in the magazine with the edge adjacent the "9" positions to the left in Fig. 1. It will be assumed that the machine previously stopped in such a position that brushes 46, 64, 67 of the commutator C—1 and impulse emitters C—6, C—3, respectively, rest on the segments corresponding to the "9" index-point position and the "9" receiving pocket. The main switch is closed and the usual starting key (not shown) may now be depressed to start the driving motor.

Since when the motor begins to turn the brushes 35 are resting on the bare contact roll, parallel circuits will be set up immediately thereby energizing all the brush relays BR0 to BR12, as follows: Left-hand line wire 48, brush 47, the common ring (not shown) coacting with brush 47, the "9" segment of commutator C—1, brushes 46 and 35a, contact roll CR, all the brushes 35 in parallel, the wires of cable 39, the windings of all the brush relays, and wire 44 to right hand line wire 45.

Energization of all the brush relays causes their contacts 49 to open and contacts 50 to close. The latter establish holding circuits for all the brush relays as follows: left-hand line wire 48, brush 55, segment 54, brush 53, wire 51, the contacts 50 and windings of all the brush relays, and wire 44, to right hand line wire 45. Contacts C—4 close shortly after the "12" position in the first cycle (Fig. 4) and remain closed for a brief period but have no effect since opening of contacts 49 of all the brush relays prevents the holding relays HR0 to HR12 from being energized over circuits extending from left-hand line wire 48, the commutator C—1, the contact roll CR, brushes 35, and cable 39 as previously traced, contacts 49, cable 52, the left-hand windings of the holding relays HR0 to HR12, wire 56, and contacts C—4, the right hand line wire 45.

Since the brush 64 rests on the "9" segment of impulse emitter C—6 at the beginning of the first cycle and none of the contacts 60 of relays HR0 to HR12 have opened, the sorting magnet SM will be immediately energized by an impulse of current over a circuit as follows: left-hand line wire 48, contacts C—7 (closed at the "9" position in the cycle, Fig. 4), wire 61, the contacts 60 of the relay HR9, the corresponding wire in cable 63 to the "9" segment of impulse emitter C—6, brush 64, wire 65, winding of relay HR13, and sorting magnet SM, to the right-hand line wire 45. Energization of the relay HR13 establishes a holding circuit for said relay and the sorting magnet SM through contacts 62 which circuit is held until shortly after the "12" position (Fig. 4) of the first cycle. The energization of the sorting magnet SM during this cycle has no effect as at this time no card has reached or passed position B (Fig. 1). Shortly before contacts C—4 close, contacts C—5 open (Fig. 4) but the only possible effect would be to deenergize any of the holding relays HR0 to HR12 that may have been energized accidentally and it is assumed that none have as yet been energized.

During the first cycle the first card 30 will be removed from the bottom of the magazine 31 (Fig. 1) and advanced by the combined action of picker 32 and feed rollers 33 toward position A. At the end of the first cycle the leading edge of the first card will have moved to such a position that the brushes 35 are about to wipe over the surface of such card. Near the end of the first cycle the brush 53 will break contact with segment 54 and thereby interrupt the holding circuits for the brush relays BR0 to BR12. This will not happen, however until contacts C—4, C—5 have functioned to control the holding circuits for the holding relays HR0 to HR12, because during cycles in which cards are sensed the relays BR0 to BR12 must be held energized long enough to enable contacts C—4, C—5 to control the energization of such relays HR0 to HR12 as may require to be energized.

During the second cycle the brushes 35 will sense the presence of any holes in the last twelve columns of the name field on the first card. Assuming the first card is perforated in columns 9 to 15 to represent the name R. G. Dun, like in Fig. 3, the following events will take place. As none of the relays HR0 to HR12 were energized during the first cycle, brush 64 will again cause the holding circuit for sorting magnet SM to be established at the "9" position of the second cycle exactly as described above. As before no harm will be done as the first card has just passed position A and none has yet reached or passed position B. There are no holes in any of the last 13 columns of the first card (Fig. 3) hence brushes 35 will not cause any of the brush relays BR0 to BR9 to be energized. This was not the case during the first cycle when the brushes 35 touched the bare contact roll CR throughout the first cycle.

The contacts C—5 will open during the second cycle but will have no effect as none of the holding relays HR0 to HR12 were energized during the first cycle and their contacts 58 are still open. Closure of contacts C—4 thereafter sets up a series of parallel circuits through the left hand windings of relays HR0 to HR12 and contacts 49 which are all closed.

Each circuit extends from left-hand line wire 48, through commutator C—2, wire 51, contacts 49 of each brush relay, a wire in cable 52, the left-hand winding of each holding relay, wire 56, and contacts C—4 to right-hand line wire 45. Energization of all the holding relays HR0 to HR12 will result and will cause all contacts 58 to close and all contacts 60 to open. Closure of contacts 58 of each holding relay establishes a holding circuit from left-hand line wire 48, wire 59, contacts 58, the right-hand winding of each relay, wire 57, and contacts C—5, to right-hand line wire 45. Thus, at the end of the second cycle, the relays HR0 to HR12 will all be energized and the first card will have reached position B while the second card will have reached position A. The commutator C—2 will not break any circuit during the second cycle as the contacts C—4 will break the circuits through the left-hand windings of relays HR0 to HR12 before the brush 53 leaves the segment 54 (see Fig. 4).

When the third cycle begins and the sensing of the second card commences, the leading edge of the first card will have reached position B, the leading edge of the second card will have reached position A, and all the relays HR0 to HR12 will have been energized. Assume that the second card is perforated in columns 9 to 25 to represent the name Phillip Morris Co., requiring 17 columns of the name field. In this card no perforations will appear in columns 16, 23, 26, 27, 28, columns 16 and 23 being spacing columns. During the third cycle the upper three brushes 35 (Fig. 2) and the sixth brush from the top will not sense holes hence the brush relays BR4, BR7, BR8, BR9, will not be energized while all the remaining brush relays will be energized. Since the condition of the holding relays HR0 to HR12 can not be changed until contacts C—4, C—5 are operated after the "12" position and these relays are still energized holding contacts 60 open, it is clear that the brush 64 will not set up a circuit through the sorting magnet SM during the third cycle and the first card will be carried beneath all the upturned ends of blades 41 (Fig. 1) into the reject pocket.

The opening of contacts C—5 after the "12" position of the third cycle and prior to closure of contacts C—4 causes all the relays HR0 to HR12 to be deenergized but the relays BR4, BR7, BR8, and BR9 remain energized. When contacts C—4 close, only the relays HR4, HR7, HR8, HR9, will be energized, and are kept energized through their contacts 58 until contacts C—5 open during the fourth cycle. Thus, when the fourth cycle commences and analysis of the third card begins, the contacts 60 of relays HR4, HR7, HR8, HR9, will be open.

During the fourth cycle the brush 64 will wipe over the "9", "8", "7" segments of emitter C—6 without effect but on contacting with the "6" segment will energize the sorting magnet SM through contacts 60 of the relay HR6 which have remained closed. This will take place when the leading edge of the second card is under the sorting blade 41 leading to the "6" pocket so that the second card will be guided to the "6" pocket. Later in the fourth cycle the contacts C—5 will deenergize the relays HR9, HR8, HR7, and HR6 in readiness for energization of the holding relays in accordance with the analysis of the third card. If the latter is perforated to designate the name "Bradstreet", for example, occupying ten columns of the name field, the third card will cause all the relays HR1 to HR9 to be energized and during the fifth cycle the third card would be guided to the "11" pocket.

It is quite clear that the cards will be distributed to the receiving pockets according to the number of unperforated columns in the right hand portion of the name field (Fig. 3) and cards having no perforations in the last twelve columns will be guided to the reject pocket. Thus, when all cards like those listed hereinbefore have been sorted, the distribution of the cards to the various pockets will be as follows:

"9" Pocket

Botany Worsted Mills
Imperial Oil Limited

"7" Pocket

Socony Vacuum Corp

"6" Pocket

Phillip Morris Co
American Cyanamid

"5" Pocket

Wright Aero Corp

"3" Pocket

Jenkins Mfg Co

"2" Pocket

Spicer Mfg Co

"11" Pocket

Bradstreet
Simmons Co

"Reject" Pocket

Dun R G

The cards may then be sorted in the usual way in accordance with the values of the holes in the different columns. This is done by substituting the brush 35b for the brushes 35, adjusting the brush 35b in the usual manner to coact with the desired column of the card, and starting the machine as before by depressing the start key. During the first cycle the relays BR0 to BR12 will be energized in the same order as the brush 35b senses the index point positions of the cards, namely 9, 8, 7, . . . 0, 11, 12, due to the fact that brush 67 alternately connects brush 35b, bearing on the bare contact roll, with the windings of the brush relays. Thus, none of the relays HR0 to HR12 will be energized when contacts C—4 close. During the second cycle the first card will be analyzed by brush 35b and, assuming a hole appears in the "6" index point position, a circuit will be established as follows: left-hand line wire 48, brush 47, the "6" segment of commutator C—1, brushes 46, 35a, contact roll CR, brush 35b wire 39, the brush 67, the "6" segment of emitter C—3, the wires in cables 66, 39 leading to relay BR6, the winding of the latter, and wire 44 to right hand line wire 45. The relay BR6 will establish a holding circuit for itself through its contacts 50 as described before, and later in the cycle all the holding relays except HR6 will be energized. During the third cycle only the "6" segment of emitter C—6 will be active (since contacts 60 of relay HR6 are the only ones closed), hence the sorting magnet SM will be energized at the "6" point in the third cycle to effect the disposition of the first card in the "6" pocket.

In sorting the records into alphabetical order after a preliminary sorting operation to place the records into groups according to length of name, the group having the longest name is sorted first and with respect to the highest perforated column. In the illustrative example, the cards in the "9" pocket, having the longest name, would be sorted with respect to the 28th column to place the cards in alphabetical order. Then the cards from the "7" and "9" pockets would be combined and sorted with respect to column 26. Next the cards from the "9", "7", and "6" pockets will be combined and sorted with respect to column 25. This scheme is followed until, as the final series of operations, all the cards have been sorted with respect to columns 9 to 16. It will be seen that the R. G. Dun cards would need to be sorted only fourteen times each and the useless handling of each of such cards twenty-six times is eliminated. Proportional savings for other cards reduce the time required to sort the record cards to a fraction of that formerly necessary.

The invention is also adapted to shorten very materially the time spent in sorting according to serial numbers, account numbers, or class numbers. Take a case where 99,999 cards are to be sorted into serial order and the serial numbers are punched in five columns. By former methods each of the cards would have to be sorted five times, that is, once with respect to each column of the serial number field. In other words the machine would, in effect, have to sort 499,995 cards which, at 400 cards per minute, would require uninterrupted operation of a sorting machine for about 20.7 hours.

With the present invention the cards may be first sorted into five groups according to the number of digits in the serial numbers and only 20.2 hours are required which is a saving in time of approximately 2½%. When there are a large number of low numbers and relatively few high numbers, as might be the case in sorting with respect to class numbers or account numbers in frequent use, the saving in time is much greater.

This will be appreciated when it is realized that in the illustrative example of 99,999 cards, the sorting by length of serial number divides the cards into five groups comprising 9, 90, 900, 9,000 and 90,000 cards respectively, so that about 90% of the cards must pass through the machine five times each. If the lower numbered cards are most common, the last two groups will represent a smaller proportion of the total and the saving in time will be correspondingly greater. In sorting according to classification or account numbers, where the operator may be fairly certain what numbers are likely to be most used, the choice of the preliminary sorting operation to divide the cards into groups according to the number of digits in the numbers may result in a very large saving in time. This is very likely to be true of the account numbers of customers of a firm, as the account numbers of old customers are likely to be most used whereas the account numbers of new customers (since they may be larely single trial orders of goods) may be less in number.

It is common practice, when perforating records according to serial numbers, account numbers, and class numbers, to locate the numbers with reference to the extreme right hand column of the field, devoted to receiving such numbers and to place zero holes in the columns which do not have numeral holes. Thus, in the case of column account number field in Fig. 3 the units are perforated in column 37 and such cards can be sorted according to the member of significant digits in the serial number by placing the cards face up in the magazine 31 with the edge adjacent the "9" positions to the left (Fig. 1) so that the extreme left hand brush 35, or the uppermost (Fig. 2), senses column 29 of the account number field, the next adjacent brush 35 senses column 30, and so on. Some of the brushes 35 (the lowest there is) (Fig. 2) will sense columns 38, 39, 40 of the amount field but will have no effect as the holes in columns 29 to 37 will dominate in controlling the sorting magnet.

The "0" segment of the commutator C—1 will be made non-conducting so that the "0" holes in the columns 29 to 37 will have no effect and the sorting will be effected under control of the holes designating the highest denominational order.

If the account numbers have been perforated in such a fashion that the highest denominational order appear in column 29 (Fig. 3), the cards should be placed in the magazine face down with the uppermost brush 35 (Fig. 2) sensing column 37. As in this case zero holes should be used only when they are actually part of a number, like "100" for instance, the "0" segment of commutator C—1 be made current conducting.

The present invention has one important feature which is valuable in shortening the time necessary to sort records where holes may appear in any one of several columns. In other words sorting may be effected in accordance with the horizontal disposition of a hole (Fig. 3) as well as in accordance with the usual vertical disposition. As an example, holes are frequently provided in several columns to effect a special classification control of the tabulating machine, the value of a hole and its location in a selected column of a field in a card determining the classification of such card and its effect on the tabulating machine. As an example, it will be assumed that a field of six columns is devoted to class selection purposes and holes are likely to appear in any one of these columns to indicate a type of transaction or business operation and control the tabulating machine according to the disposition of such hole in the columns of the class selection field. It will also be assumed that it is desired to sort the cards into groups according to the disposition of the holes in the several columns without regard to numerical value of such holes. This can be done very easily by setting the brush holder so that the uppermost six brushes 35 sense the six columns of the class selection field in exactly the same fashion as, in the case first described, in sorting according to the lengths of names in the different cards.

After all the cards have been sorted those having a hole in the first column of the class selection field will be found in the "4" pocket, those having a hole in the second column will be found in the "5" pocket, and so on, the cards perforated in the sixth column being found in the "9" pocket. This same result could be secured on present types of sorting machines only by sorting all the cards at least once and most of the cards at least six times.

When the class selection holes are placed in the "11" or "12" position of columns used to record other data, the commutator C—1 can be made non-conducting for all positions in which a hole designating other data is likely to appear.

It is quite apparent that the present invention provides a machine which is more flexible than prior machines and capable of sorting records in much less time besides having several distinctly new features.

There has been described herein a form of embodiment of the invention which embodiment is purely illustrative and was chosen solely for convenience in explaining the operating principle of the invention and how it may be incorporated in a wellknown type of machine. The invention has broad aspects, however, and can be modified or varied to suit the different conditions likely to be encountered in practice and/or can be embodied in machines other than the one described. It is not desired, therefore, to be limited to the precise form of embodiment and machine selected for purposes of illustration, but to be limited only by the scope of the following claims as measured by the extent of prior art.

I claim:

1. A sorting machine comprising sorting mechanism including a sorting circuit, a rotary switch adapted to differentially control the operation of the sorting circuit, a plurality of control circuits for controlling the effect of the rotary switch on the sorting circuit, and analyzing means for operating the control circuits according to the disposition of data designations in the different columns of records sensed by the analyzing device.

2. A sorting machine comprising a record analyzing device adapted to sense a plurality of columns of a field in successively presented records, a series of control devices, one for each column, adapted to be controlled by the part of the analyzing device sensing the corresponding column, each control device being rendered active or inactive according to the presence or absence of designations in the corresponding columns of the records, sorting mechanism, and a sorting control element controlled by all the control devices for selectively controlling the sorting mechanism in accordance with the number of designated columns.

3. A sorting machine for alphabetical record cards comprising sorting mechanism including a plurality of sorting guides, a single element for selectively operating all of said guides; and analyzing members, one for each guide, each member being adapted to sense designations in one of a plurality of columns of an alphabet field in records successively presented to the analyzing members, said analyzing members controlling the single operating element according to the number of columns having alphabet designations.

4. A sorting machine comprising a sorting circuit; a series of relays, one for each column of a field in successively present records, said field consisting of several columns, each relay being adapted for controlling the sorting circuit differently from the other relays, means connected to the sorting circuit for successively sensing the status of said relays and controlling the sorting circuit accordingly, and means controlled by a designation in one of said columns for rendering the corresponding relay active.

5. A sorting machine comprising sorting mechanism including a series of sorting pockets, guides for distributing records to said pockets, and a magnet for selecting the guides for operation; an electrical impulse emitter for operating the sorting magnet; a plurality of relays, each associated with a sorting pocket and adapted to control the impulse emitter differently from the other relays; and a multi-column analyzing device having a plurality of sensing elements, one for each column of a field, said sensing elements rendering the relays active and inactive in accordance with the presence and absence of data designations in the different columns.

6. A machine for sorting alphabetical record cards according to the lengths of names which are identified by means of holes in the columns of a name field, comprising a plurality of record receiving pockets, means for guiding the records into said pockets, a single sorting control element for directly controlling all of the guiding means to select a pocket for receiving a record; a plurality of record sensing elements, each corresponding to a column of the name field and adapted to sense holes designating the parts of a name; a series of settable control devices one for each sensing element and adapted to be set by the latter on the sensing of a hole in the corresponding column of the record; and means for successively connecting the set of elements to the sorting control element whereby to operate the guiding means in accordance with the length of a name on the record sensed by the sensing elements.

7. A machine for sorting statistical record cards wherein data designating holes may be differentially disposed in a selected vertical column of a field consisting of several columns, comprising a plurality of sensing elements each adapted to detect the presence of a hole in one of the columns of a field; sorting mechanism including a plurality of sorting pockets, one for each column and corresponding to a sensing element; card guiding elements, one for each pocket; an element variably operable to select a guide; a plurality of settable control devices, one for each sensing element and column and set by the corresponding sensing device when the latter senses a hole, and means connected to the variably operable element for actuating the latter in accordance with the settings of the settable devices whereby to sort the records into the pockets corresponding to columns in which holes appear.

8. A machine for sorting alphabetical record cards according to length of alphabetical data, such data being designated by holes differentially disposed in an alphabet field composed of several columns of the card, comprising sorting mechanism, a single sorting magnet for controlling the sorting action of said mechanism; a plurality of columnar analyzing devices for said field, each analyzing device being adapted to sense the presence of holes in a given column of the alphabet field; a series of relays, each corresponding to one of the sensing devices and energized whenever the corresponding sensing device senses a hole in the alphabet field, the number of said relays energized depending on the length of alphabet data recorded in the alphabet field; and means for transmitting an operating impulse to the sorting magnet according to the number of relays energized whereby the action of the sorting mechanism is controlled in accordance with the length of alphabet data in the alphabet field.

9. A sorting machine for sorting statistical record cards bearing alphabetic data according to the length of such data, comprising a record analyzing device adapted to sense successively the index-point positions of an entire data field consisting of a plurality of columns some of which may have alphabet designations and others of which may not have such designations owing to differences in the length of words and the like represented by the alphabet data designations, a series of sorting stations each assigned to one column of the field and intended for the reception of all cards whose names terminate in such column, a series of storing devices one for each pocket and column and settable by the analyzing means in accordance with the number and location of the columns having alphabet designations, a single sorting station selecting device, and means for operating the selecting devices in accordance with the settings of the storing devices.

10. A machine for sorting statistical records comprising an analyzing device including a row of analyzing elements each adapted to traverse one of the columns of a field in the records so as to successively sense the index point positions of said field to detect data designations placed in any of the columns composing such field, sorting mechanism including a sorter control element adapted to selectively control sorting operations of said mechanism, and means controlled by the analyzing elements for operating the sorter control element in accordance with the number of designated columns traversed by the analyzing device.

11. A sorting machine for perforated records comprising a series of record receiving pockets, a series of guides leading to said pockets and an element common to all the guides for selecting a guide for operation, a rotary selecting element common to said guides for controlling the operation of the selecting element, and a series of record analyzing elements one for each column of a field in the controlling records wherein the number of perforated columns varies, said analyzing elements varying the effect of the rotary selecting element on the guide selecting element in accordance with the number of perforated columns in the records.

12. A sorting machine for statistical records bearing data designations, a series of record receiving pockets, means to guide the records to the pockets, a pocket selecting element common to all the pockets and adapted to selectively actuate the guiding means whereby to determine the pockets which are to receive the records; a series of record analyzing elements arranged in a row and adapted to sense together the correspondingly valued data designations in the columns of an entire field in the controlling records, each element sensing an entire column; and means controlled by said analyzing elements for operating the pocket selecting element in accordance with the disposition of designations in said field along the row of analyzing elements.

13. A sorting machine for statistical records bearing data designations, means to feed the records in succession by a continuous movement, a row of exploring elements each assigned to a single column of a field in the records and adapted to sense the presence of designations in the different index-point positions of its assigned column while the records are being fed by the feeding means; a series of sorting pockets each assigned to the exploring element of a predetermined column, means for guiding the records into said pockets, and means controlled by the exploring elements for selectively actuating the guiding means whereby to guide a card having a designation in a predetermined column of the field sensed by the exploring elements into the pocket assigned to the exploring element sensing the predetermined column.

EDWARD J. RABENDA.